(12) United States Patent
Dusha

(10) Patent No.: US 9,541,392 B2
(45) Date of Patent: Jan. 10, 2017

(54) SURVEYING SYSTEM AND METHOD

(71) Applicant: LEICA GEOSYSTEMS AG, Heerbrugg (CH)

(72) Inventor: Damien Dusha, Dutton Park (AU)

(73) Assignee: LEICA GEOSYSTEMS AG, Heerbrugg (CH)

( * ) Notice: Subject to any disclaimer, the term of this patent is extended or adjusted under 35 U.S.C. 154(b) by 116 days.

(21) Appl. No.: 14/436,445

(22) PCT Filed: Oct. 15, 2013

(86) PCT No.: PCT/EP2013/071548
§ 371 (c)(1),
(2) Date: Apr. 16, 2015

(87) PCT Pub. No.: WO2014/060429
PCT Pub. Date: Apr. 24, 2014

(65) Prior Publication Data
US 2015/0268045 A1 Sep. 24, 2015

(30) Foreign Application Priority Data
Oct. 18, 2012 (EP) .................................... 12188965

(51) Int. Cl.
*G01C 15/00* (2006.01)
*G01C 15/06* (2006.01)
*G01C 21/16* (2006.01)

(52) U.S. Cl.
CPC .............. *G01C 15/06* (2013.01); *G01C 21/16* (2013.01); *G01C 21/165* (2013.01)

(58) Field of Classification Search
CPC ........ G01C 15/06; G01C 21/16; G01C 21/165
(Continued)

(56) References Cited

U.S. PATENT DOCUMENTS 5,512,905 A 4/1996 Nichols et al.
2003/0046003 A1 3/2003 Smith et al.
(Continued)

FOREIGN PATENT DOCUMENTS

EP 1726915 A1 11/2006
EP 2040029 A1 3/2009
(Continued)

OTHER PUBLICATIONS

European Search Report dated Mar. 4, 2013 as received in Application No. 12 18 8965.
(Continued)

*Primary Examiner* — Yaritza Guadalupe-McCall
(74) *Attorney, Agent, or Firm* — Maschoff Brennan

(57) ABSTRACT

Surveying system for measuring the position of a measuring point on the ground is disclosed. The surveying system may include a survey pole with a body having a pointer tip for contacting the measuring point and position giving means for making available the coordinative determination of a referenced position, being placed on the body with a defined spatial relationship relative to the tip. Determination means may be included for repeatedly determining the referenced position of the position giving means. Evaluation means may also be included for deriving the position of the measuring point. In some embodiments, the survey pole may also include an inertial measuring unit placed on the body with a defined spatial relationship relative to the position giving means.

20 Claims, 4 Drawing Sheets

(58) Field of Classification Search
USPC .......................................... 33/290, DIG. 21
See application file for complete search history.

(56) References Cited

U.S. PATENT DOCUMENTS

| | | | |
|---|---|---|---|
| 2005/0251328 A1 | 11/2005 | Merwe et al. | |
| 2009/0024325 A1 | 1/2009 | Scherzinger | |
| 2015/0268045 A1* | 9/2015 | Dusha | G01C 15/06 33/228 |
| 2015/0276402 A1* | 10/2015 | Grasser | G01C 15/06 702/150 |
| 2016/0153767 A1* | 6/2016 | Ihlenfeldt | G01B 5/008 33/503 |

FOREIGN PATENT DOCUMENTS

| | | |
|---|---|---|
| EP | 2 264 485 A1 | 12/2010 |
| JP | 2005043088 A1 | 2/2005 |
| WO | 2009043183 A1 | 4/2009 |

OTHER PUBLICATIONS

Norgaard et al., "New developments in state estimation for nonlinear systems", Automatica, vol. 36, Issue 11, Nov. 2000, pp. 1627-1638.

M. Norgaard, N. Poulsen, O. Ravn: "New developments in state estimation for nonlinear systems." Automatica 36 (11): 1627-1638, 2000.

J. Crassidis, F. Markley: "Unscented Filtering for spacecraft attitude estimation." Journal of Guidance Control and Dynamics, 26 (4): 536, 2003.

J. A. Farrell, "Aided Navigation: GPS with High Rate Sensors." McGraw Hill, 2008.

Malcolm D. Shuster, "A survey of attitude representations." Journal of the Astronautical Sciences, 41(4): 439-517, 1993.

* cited by examiner

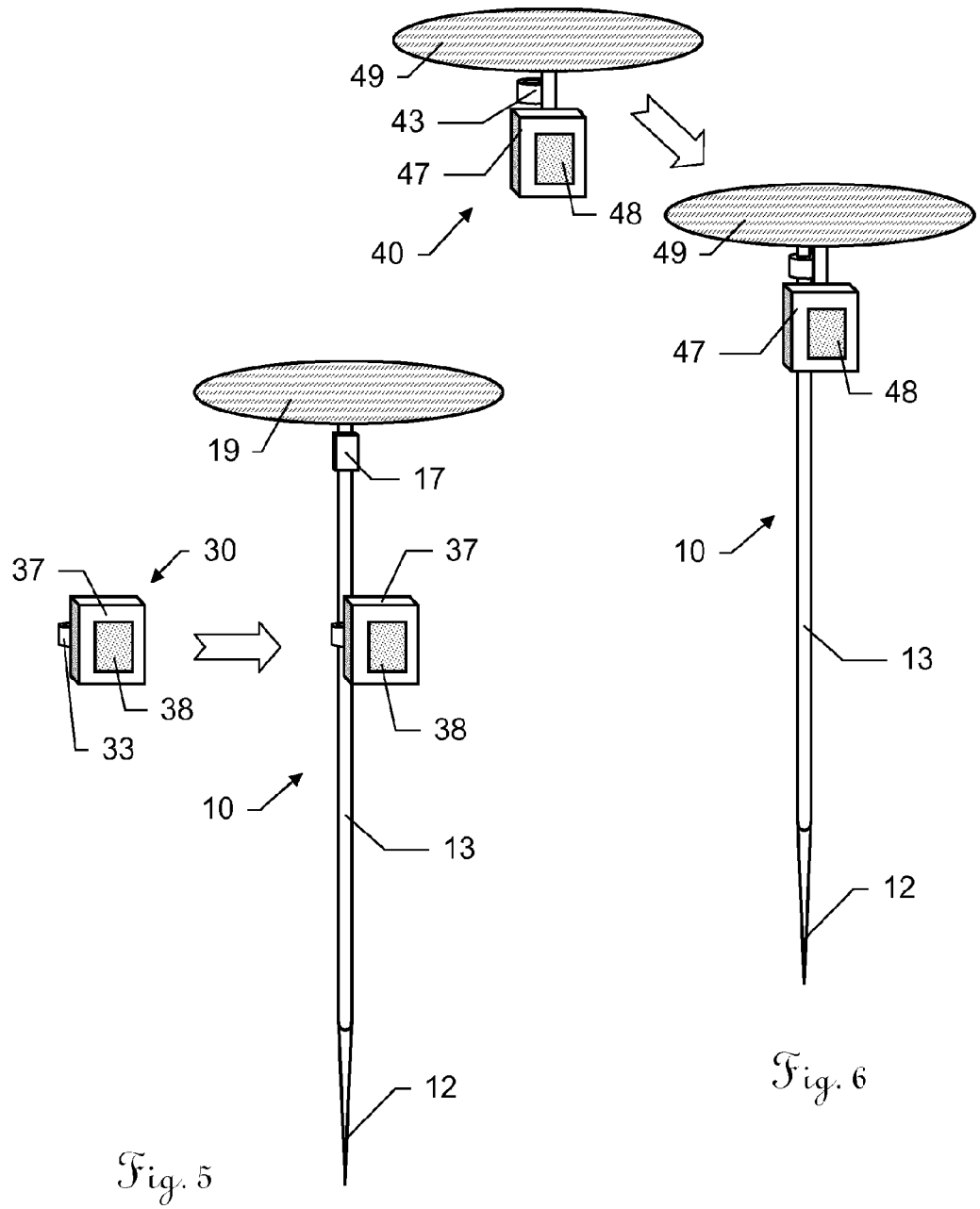

SURVEYING SYSTEM AND METHOD

FIELD OF THE INVENTION

The invention pertains to a surveying system and a surveying method for measuring the position of a point on the ground with the help of a survey pole. It also pertains to an upgrade kit and a surveying module for such a surveying system and to a computer programme product for executing steps of such a surveying method.

BACKGROUND

In survey applications using GNSS equipment, the measurement taken by the GNSS receiver does not directly correspond to the target point to be surveyed; rather, it is a position measurement of the so-called "phase-centre" of the GNSS antenna. Current practice is to mount the antenna on a pole and ensure the pole is perfectly vertical over the point of interest and compensate the position for the length of the pole. Levelling the pole, however, takes time and it would be desirable to take measurements of the target position without the need to level the pole.

In this document, a method is detailed for the accurate compensation of the tilt of the pole using a fusion of relatively low-cost inertial sensors (accelerometers and gyroscopes) and GNSS measurements. It has advantages over other disclosed methods as the inertial sensors are of substantially lower cost and sensor errors are explicitly estimated at run-time.

Global Navigation Satellite Systems (GNSS), such as the NAVSTAR Global Positioning System (GPS) are now routinely used in surveying applications with the use of Real-Time Kinematic (RTK) algorithms, which correct for a receiver's position using information from one or more nearby base station(s).

The position measured by the GNSS receiver is at the so-called "phase centre" of the GNSS antenna, which for a high-quality survey antenna is a well-quantified location generally near the mechanical centre of the antenna. However, the location of interest to the surveyor is not at the antenna, but at a point on the ground; the antenna is usually mounted on a pole to optimise the reception of GNSS signals.

Unless the pole is perfectly upright with respect to the ground, the horizontal position of the antenna will be offset compared to the location on the ground of interest. A levelling device, whether a traditional spirit level or a more sophisticated arrangement of sensors, can be used to determine if a pole is upright to some degree of tolerance sufficient to take a measurement. Alternatively, if one can precisely measure the angular orientation (the "attitude") of the pole, this error can be compensated for, assuming one knows the length of the pole.

Measuring the angle of the pole with respect to the ground is not a trivial exercise. Whilst measuring the angle of the pole from the vertical (the pitch and roll) can be accurately achieved through a number of methods (notably, measurement of local gravity using accelerometers or inclinometers), measuring the orientation of the pole with respect to True North (the yaw or azimuth) is considerably more difficult.

The most obvious way to achieve a measurement of azimuth is with the use of an electronic compass, which is able to measure orientation with respect to Magnetic North. However, aside from the offset between Magnetic North and True North, the compass reading can also be affected by magnetic field disturbances such as ferrous metals and electric currents, both of which are common around some building sites. To avoid these drawbacks, another method of determining the yaw is desirable.

When installed in a conventional land vehicle such as a car, the azimuth angle is able to be inferred from the GNSS velocity, since the vehicle is normally aligned with the direction of travel. However, since a pole-mounted antenna may move in an arbitrary direction, GNSS velocity is not a reliable means of azimuth determination.

When stationary, high-grade inertial sensors are capable of measuring the Earth's rotation rate, which may then be used for finding north. When using high-quality gyroscopes ("gyros"), a procedure known as "gyro compassing" can be used whilst stationary to determine north by comparing the measured rotation rate in each axis.

Once an initial position and attitude is known, a high-quality INS can navigate without reference to GNSS or other external measurements, making it useful for survey applications when GPS is unavailable. This is described, for instance in US 2009 024 325 A1 which describes an INS used in a surveying application with a GNSS solution being unavailable. However, as an inertial navigation solution mathematically rotates and integrates the raw inertial sensor measures, small errors will accumulate and the position solution (and azimuth solution, which must be maintained as a by-product) will drift without bound.

The drift problem of an INS has been studied extensively for some time. The drift in the position and attitude solution (and thereby the means to compensate for pole tilt) can be contained by intelligently fusing GNSS or other external measurements with an inertial navigation system—the so-called "Aided Inertial Navigation System" (AINS)—which has long existed in the aerospace industry and is now used in surveying applications.

Whilst high-quality "navigation grade" and "tactical grade" inertial sensors—navigation grade refers to sensors that can be useful for standalone navigation for many hours, e.g. including Ring Laser Gyroscopes (RLG), whereas tactical grade generally refers to navigation requirements for short flights, e.g. including Fibre Optic Gyroscopes (FOG)—are undoubtedly useful in determining position and attitude (whether GNSS aided or otherwise), they are also very expensive, heavy, bulky and suffer from high power consumption. In contrast, the last decade or so has seen the rise of inertial sensors based on MEMS (Micro-Electro-Mechanical Sensors) technology, which have substantially lower performance in comparison with traditional high-grade devices, but have the advantage of being small, low-power lightweight, and more than an order of magnitude less expensive than high-grade inertial sensors. MEMS inertial sensors are now routinely integrated into low-accuracy consumer applications such as games console controllers and mobile phones. MEMS sensors are normally of "consumer grade" or "industrial grade", though some high-end silicon MEMS may also be considered as tactical grade. Consumer grade refers to cheap sensors having coarse motion sensing for applications such as shock detection, free-fall detection, mobile phones or computer games controllers. Industrial grade refers to sensors that are useful for applications where some degree of motion sensing precision is required, such as manufacturing robots, machine control, automotive electronic stability, hill-start assistance and entry-level Attitude and Heading Reference Systems (AHRS).

MEMS sensors, like many integrated circuit technologies, have substantially improved in performance over time. Although they presently remain unsuitable for standalone inertial navigation, they may be fused with GNSS measurements in a similar fashion to a high-grade AINS solution to maintain an attitude solution of sufficient accuracy to compensate for the tilt of a survey pole. Furthermore, the combination of GNSS and INS is greater than the sum of its parts-intelligent integration of the two allow for the most substantial errors that exist in MEMS inertial sensors to be estimated and removed.

The drawback of using MEMS devices is that it relies on a good-quality GNSS solution to be available, which is generally the case for many surveying and related activities such as stake-out. Usually, more than a few seconds without a GNSS solution will cause the attitude to drift out of tolerance, depending on the grade of sensor. Generally, a high-quality position is required survey applications and therefore attitude drift during GNSS outages is usually not problematic. Once a GNSS reacquired, a smaller drift will speed up re-convergence of the attitude solution. It is up to the designer to make the trade-off between stability and cost.

Attitude may be interpreted as a combination of three different rotations-roll, which (when related to an aircraft) is "wings up, wings down"; pitch, which is "nose up, nose down" and yaw, which corresponds to the heading that the platform is pointing. Classically, pitch and roll are observed through measurements of the local gravity vector (which induce an acceleration measurement on the accelerometers) and yaw is observed through the use of a magnetic compass.

Whilst in prior art—for example in US 2003 046 003 A1, U.S. Pat. No. 5,512,905 A, EP 2 040 029 A1, EP 1 726 915 A1 and JP 2005 043 088 A—an accelerometer ("tilt sensor") and compass has been used previously to compensate for the tilt of a pole, it is limited by the accuracy of the sensors and subject to local magnetic field disturbances. For example, a typical MEMS accelerometer may be four degrees or more in error without careful factory calibration, which is unacceptable for survey applications. Furthermore, without a high-fidelity and computationally expensive magnetic model, even the local declination angle (the angle between true north and magnetic north) may be in error by up to three degrees, even without any local disturbing fields caused by (for example) cars and power lines.

When inertial sensor measurements are intelligently combined with GPS, both the yaw angle (even without the aid of a magnetic compass) and sensor errors causing the errors in pitch and roll may be estimated when subjected to particular motion conditions. In particular yaw angle, generally considered to be the hardest to estimate, has been shown in the academic literature to converge towards its true value when the inertial sensors are subjected to changes in acceleration in the horizontal plane, which is often the case during a surveying operations. The situation is further complicated for MEMS devices, which have significant errors compared to high-grade devices. In high-grade sensors, bias errors on the vertical gyro are naturally observable through the rotation of the Earth. In MEMS devices, the signal caused the Earth's rotation is buried in noise and bias. Therefore, MEMS will require more aggressive manoeuvring to make yaw observable, but the basic fact that it is observable under motion is unchanged.

With this observation in mind, it can be noted that a magnetic compass is not strictly necessary for the estimation of yaw (and therefore can be removed if cost is a concern), but may still be used for a coarse initialisation of yaw or to provide supplementary measurements if the yaw has drifted due to the lack of motion for some time.

The notation used in this document is as follows:

An identity matrix of size k is denoted by $I_k$. The rotation matrix from the a-frame to the b-frame is denoted by $R_a^b$.

$\alpha_{ab}^c$ denotes a vector quantity $\alpha$ of the b-frame with respect to the a-frame, expressed in terms of the c-frame.

$[A]_x$ is a skew-symmetric matrix constructed from vector A such that when multiplied by vector B the result is equivalent to the cross-product of A and B, viz $[A]_x B = A \times B$.

Time derivatives of a quantity are expressed using the dot notation (e.g. $\dot{\omega}_{ab}^c$), estimated quantities (as distinct from their true values) are denoted with a hat (e.g. $\hat{\omega}_{ab}^c$).

In this document, the b-frame is the body fixed frame, the n-frame is an earth-fixed local tangent frame (north, east, down), the e-frame is the Earth-Centred Earth-Fixed (ECEF) frame and the i-frame is the Earth-Centred Inertial (ECI) frame.

The GPS/INS estimates a position at the reference point of INS, $r_{eb}^e$. The position on the ground at the end of the pole, $r_{ep}^e$, is desired. Since the offset of the INS reference point from the tip of the pole, $r_{bp}^b$, is known (i.e. the pole length and the location of the INS reference point on the end of the pole), one may calculate the point at the tip of the pole using:

$$r_{ep}^e = R_b^e r_{bp}^b + r_{eb}^e$$

Key to the accurate compensation of tilt is the attitude estimate. Clearly, any errors in attitude will couple onto errors at the ground point.

The observation of attitude and sensor errors relies on comparing the difference between the GPS position and the INS position. GPS velocity may also be used. Under motion, position errors coupled in from attitude errors can be indirectly separated. Note that an INS must maintain an accurate representation of attitude as a by-product of calculating a position solution.

Integrated GPS/INS navigation systems have long been used in the aerospace domain, owing the complementary characteristics of the two navigation sources. As such, multiple textbooks have been published on the subject which recommend a so-called loosely-coupled error-state system, for instance Robert M. Rogers: *Applied Mathematics in Integrated Navigation Systems*. AIAA Education, $3^{rd}$ edition, 2007.

There are several components in the integration architecture:

1. An Inertial Measurement Unit (IMU), comprising three accelerometers, three gyroscopes in a nominally orthogonal configuration, associated support circuitry for signal acquisition, pre-processing, time synchronisation and deterministic error removal;
2. The Inertial Navigation System (INS) mechanisation, which mathematically rotates and integrates the accelerations and rotation rate measurements from the IMU to estimate the position and attitude;
3. A GPS receiver, measuring position and velocity of the antenna;
4. A Kalman Filter, which estimates the errors of position, errors in velocity, errors in attitude, gyro biases and accelerometer biases, based on the error dynamics of the system and observed difference between the GPS and INS positions; and
5. Optionally, a two- or three-axis magnetometer for measuring the Earth's magnetic field.

The key feature of the classic loosely-coupled error-state estimator is the linearization of the dynamics, which allows the use of a linear Kalman Filter. The major drawback of using such an architecture is the assumption that the errors are small and hence the error introduced by linearization is negligible. Whilst this might be true using high-quality sensors and a specific initialisation procedure, surveying applications (and especially construction surveying) is significantly more cost sensitive than the aerospace domain and hence estimation methods designed for high-quality sensors are not necessarily applicable to lower-cost MEMS inertial sensors described in the introduction. In particular, the small error assumption results in poor performance when using low-cost sensors. It is inherently clear that a better estimator is required for use with low-cost sensors.

In particular, the standard methods of GPS/INS integration, as for instance disclosed in US 2009 024 325 A1, have insufficient performance to reliably determine the attitude of the pole when using industrial-grade sensors. Therefore, these methods are fundamentally not viable for industrial grade sensors.

SUMMARY

Some embodiments of the present invention provide an improved surveying system and an improved surveying method for measuring the position of a measuring point on the ground.

Some embodiments of the present invention provide such a surveying system and such a surveying method for quickly, reliably and precisely measuring the position of a measuring point on the ground.

Some embodiments of the invention provide such a surveying system at lower costs.

According to the invention a surveying system for measuring the position of a measuring point on the ground comprises a survey pole. The survey pole comprises a body having a pointer tip for contacting the measuring point and position giving means for making available the coordinative determination of a referenced position. The position giving means—e.g. a GNSS receiver, such as a GPS antenna, or a retro-reflector for use with a total station—are placed on the body of the survey pole with a defined spatial relationship relative to the tip. The survey pole further comprises an inertial measuring unit that is placed on the body with a defined spatial relationship relative to the position giving means and is designed in form of a micro-electro-mechanical system and comprises IMU-sensors including accelerometers and gyroscopes.

The surveying system comprises determination means for repeatedly determining the referenced position of the position giving means and IMU-processing means for repeatedly determining inertial state data based on measurements taken by the inertial measuring unit. The surveying system furthermore comprises evaluation means for deriving the position of the measuring point at least based on the determined referenced position and on the defined spatial relationship of the position giving means relative to the tip. The evaluation means are also configured for feeding a predefined filter algorithm with the repeatedly determined referenced position and the repeatedly determined inertial state data and deriving therefrom referenced attitude data for the survey pole, taking into account the defined spatial relationship of the inertial measuring unit relative to the position giving means, and for using the referenced attitude data for deriving the position of the measuring point.

According to the invention, the evaluation means are configured for using a Divided Difference Filter (DDF) within the predefined filter algorithm.

Preferably, the inertial measuring unit is designed in form of a micro-electro-mechanical system and comprises IMU-sensors including accelerometers and gyroscopes.

In a preferred embodiment the inertial measuring unit comprises three accelerometers in a mutually orthogonal configuration and three gyroscopes in a mutually orthogonal configuration.

In one embodiment the inertial measuring unit comprises inertial sensors of "tactical grade" or lower, i.e. typically having
  a gyro bias stability of >0.1 deg/hr,
  a gyro scale factor of >10 ppm,
  a gyro noise of >0.01 deg/rtHr,
  an accelerometer bias stability of >0.1 mg,
  an accelerometer scale factor of >100 ppm and
  an accelerometer noise of >20 ug/rtHz.

In a preferred embodiment, the inertial sensors are of "industrial grade" or "automotive grade", i.e. typically having
  a gyro bias stability of >1 deg/hr,
  a gyro scale factor of >1000 ppm,
  a gyro noise of >1 deg/rtHr,
  an accelerometer bias stability of >1 mg,
  an accelerometer scale factor of >1000 ppm and
  an accelerometer noise of >100 ug/rtHz.

In another preferred embodiment the IMU-processing means are configured for determining inertial position data and inertial attitude data as part of the inertial state data, particularly also inertial velocity data and IMU-sensor error parameters.

In a further preferred embodiment the inertial measuring unit further comprises at least one magnetometer, particularly two or three magnetometers in a mutually orthogonal configuration, and the IMU-processing means are configured for determining also compass-attitude data as part of the inertial state data.

Preferably, the IMU-processing means are configured for repeatedly determining the inertial state data with a higher rate than the determination means the referenced position, and the evaluation means are configured for feeding the predefined filter algorithm with the repeatedly determined inertial state data with a higher rate than with the repeatedly determined referenced position.

In a preferred embodiment the position giving means comprise a retro reflector, and the determination means comprise a total station or a tacheometer for measuring the referenced position of the retro reflector.

In another preferred embodiment the position giving means comprise a GNSS-antenna, in particular a GPS receiver, and the determination means comprise a GNSS-processing unit for processing output-signals of the GNSS-antenna and deriving therefrom the referenced position of the GNSS-antenna.

In another preferred embodiment the evaluation means are further configured for deriving referenced attitude data, which for example can be represented by a referenced yaw angle, i.e. a referenced heading or azimuth angle, as well as a referenced pitch angle and a referenced roll angle, i.e. referenced tilt angles, of the survey pole.

Another aspect of the invention is an upgrade kit for a surveying system, the upgrade kit being adapted for detecting attitude data, the surveying system comprising a survey pole with a body having a pointer tip for contacting the measuring point and position giving means for making available the coordinative determination of a referenced position, the position giving means being placed on the body with a defined spatial relationship relative to the tip, particularly wherein the position giving means comprise a retro reflector and/or a GNSS-antenna, determination means for repeatedly determining the referenced position of the position giving means and first evaluation means for deriving the position of the measuring point at least based on the determined referenced position and on the defined spatial relationship of the position giving means relative to the tip. According to the invention the upgrade kit comprises an inertial measuring unit to be placed on the body with a defined spatial relationship relative to the position giving means, wherein the inertial measuring unit comprises IMU-sensors including accelerometers and gyroscopes, IMU-processing means for repeatedly determining inertial state data based on measurements taken by the inertial measuring unit, and second evaluation means configured for feeding a predefined filter algorithm with the repeatedly determined referenced position and the repeatedly determined inertial state data and deriving therefrom referenced attitude data for the survey pole, taking into account the defined spatial relationship of the inertial measuring unit relative to the position giving means, preferably using a Divided Difference Filter within the predefined filter algorithm, and further using the referenced attitude data for deriving the position of the measuring point.

Preferably, the upgrade kit comprises means for attaching the upgrade kit or parts thereof, in particular the inertial measuring unit, to the survey pole.

In a preferred embodiment the upgrade kit comprises means for detecting and/or defining a spatial relationship of the inertial measuring unit relative to the position giving means.

Another aspect of the invention is a surveying module for a surveying system, the surveying module being adapted for detecting attitude data, the surveying system comprising a survey pole with a body having a pointer tip for contacting the measuring point. The surveying module comprises position giving means for making available the coordinative determination of a referenced position, wherein the position giving means are to be placed on the body with a defined spatial relationship relative to the tip, particularly wherein the position giving means comprise a retro reflector and/or a GNSS-antenna, determination means for repeatedly determining the referenced position of the position giving means and evaluation means for deriving the position of the measuring point at least based on the determined referenced position and on the defined spatial relationship of the position giving means relative to the tip. According to this aspect of the invention the surveying module further comprises an inertial measuring unit to be placed on the body with a defined spatial relationship relative to the position giving means, wherein the inertial measuring unit comprises IMU-sensors including accelerometers and gyroscopes, and IMU-processing means for repeatedly determining inertial state data based on measurements taken by the inertial measuring unit. The evaluation means are configured for receiving the repeatedly determined referenced position and the repeatedly determined inertial state data, feeding a predefined filter algorithm with the repeatedly determined referenced position and the repeatedly determined inertial state data and deriving therefrom referenced attitude data for the survey pole, taking into account the defined spatial relationship of the inertial measuring unit relative to the position giving means, using a Divided Difference Filter within the predefined filter algorithm, and using the referenced attitude data for deriving the position of the measuring point.

The surveying method according to the invention comprises
repeatedly determining the referenced position of the position giving means,
deriving the position of the measuring point at least based on the determined referenced position and on the defined spatial relationship of the position giving means, e.g. a retro reflector or a GNSS receiver, relative to the tip,
repeatedly determining inertial state data based on measurements taken by the inertial measuring unit and
feeding a predefined filter algorithm with the repeatedly determined referenced position and the repeatedly determined inertial state data and deriving therefrom referenced attitude data for the survey pole, taking into account the defined spatial relationship of the inertial measuring unit relative to the position giving means, and
further using the referenced attitude data for deriving the position of the measuring point.

In a preferred embodiment of the method according to invention a Divided Difference Filter (DDF) is used within the predefined filter algorithm.

In another preferred embodiment of the method referenced attitude data is derived, which for example can be represented by a referenced yaw angle, i.e. a referenced heading or azimuth angle, as well as a referenced pitch angle and a referenced roll angle, i.e. referenced tilt angles, of the survey pole.

In another preferred embodiment inertial position data and inertial attitude data are determined as part of the inertial state data, preferably also inertial velocity data and IMU-sensor error parameters, especially wherein the IMU-sensor error parameters are determined based on an error model for the IMU-sensors including at least one of
sensor-bias,
sensitivity errors,
misalignment and
non-linearity errors,
as well as—as regards the gyroscopes—acceleration sensitivity.

The process of inertial navigation is to take the specific force and angular rate measurements, correct for any errors, and integrate the sensors as required to produce a position, velocity and attitude solution with respect to a reference frame. The INS mechanisation may be performed in any number of reference frames, but a convenient choice is the Earth-Centred, Earth-Fixed (ECEF) frame as it is the natural coordinate system for GPS.

Since the inertial measurements are taken with respect to inertial space, a correction for the Earth's rotation rate is required. The INS mechanisation equations in the ECEF frame may be stated as:

$$\dot{r}_{eb}^e = v_{eb}^e$$

$$\dot{v}_{eb}^e = R_b^e f_{ib}^b + g^e(r_{eb}^e) - 2[\omega_{ie}^e] \times v_{eb}^e$$

$$\dot{R}_b^e = R_b^e ([\omega_{ib}^b] \times) - [\omega_{ie}^e] \times$$

where $g^e(r_{eb}^e)$ is the gravity vector in the ECEF frame as a function of position, $r_{eb}^e$, $v_{eb}^e$ is the velocity in the earth frame and $R_{eb}$ is the rotation matrix between the body and earth frames. Equivalent expressions can be derived for other reference frames and/or attitude representations.

Since there will always be a lever arm between the Centre of Navigation (CoN) of the IMU and the GPS antenna, the observation equations relating the position of the GPS antenna must take this into account, i.e.

$$r_{ea}^e = r_{eb}^e + R_b^e l_{ba}^b$$

where $r_{ea}^e$ is the position of the antenna in the Earth frame.

The INS mechanisation and observation equations have assumed perfect knowledge of the specific force and angular rate measurements. However, inertial sensors contain a number of errors that need to be accounted for.

For a triad of accelerometers, the specific force measurement $\tilde{f}_{ib}^b$ consists not only of the true specific $f_{ib}^b$, but also includes several deterministic and random errors.

$$\tilde{f}_{ib}^b = (I_3 + S_a) f_{ib}^b + b_a + N_a + \eta_a$$

where $S_a$ is the scale factor and misalignment matrix, $b_a$ is the long-term bias vector, $N_a$ is the non-linearity matrix and $\eta_a$ is a vector of white noise.

A triad of gyroscopes will exhibit similar errors to the accelerometers, but will have an additional error induced by accelerations. Therefore, a measurement model for the body angular rate measurements $\tilde{\omega}_{ib}^b$ is as follows:

$$\tilde{\omega}_{ib}^b = (I_3 + S_g) \omega_{ib}^b + b_g + N_g + G_g + \eta_g$$

Where $\omega_{ib}^b$ is the true angular body rates and $G_g$ is the acceleration sensitivity.

Not all terms may be significant and may be accumulated in the white noise and time-varying bias terms. Others, such as non-linearity might be suitable for production measurement and compensation, but not for online estimation. Some errors may be adequately modelled as a random constant whereas others may be consistent with a Gauss-Markov process or a Random Walk.

Bias is an offset on each of the sensors and consists of a number of difference components:

$$b_a = b_T + b_t + b_0$$

Where $b_T$ is a temperature-dependant bias term, $b_t$ is a slowly time-varying bias term and $b_0$ is a constant bias, consisting of a manufacturing bias (i.e. constant from manufacture) and turn-on bias (i.e. changes each time the device is powered on). It is generally considered essential to estimate instrument biases, even for high-quality inertial sensors.

The scale factor and misalignment matrix (SFA) $S_a$ represents two common errors on the sensors; scale factor (sometimes called sensitivity errors) and cross-axis-sensitivity errors (sometimes called misalignments). The cross-axis-sensitivity errors are a combination of nonorthogonal mounting (i.e. the sensors not perfectly mounted 90°) and instrument sensitivity to orthogonal acceleration components. Thus, the errors may be written as:

$$S_a = \begin{bmatrix} S_{xx} & 0 & 0 \\ 0 & S_{yy} & 0 \\ 0 & 0 & S_{zz} \end{bmatrix} + \begin{bmatrix} 0 & \gamma_{xy} & \gamma_{xz} \\ \gamma_{yx} & 0 & \gamma_{yz} \\ \gamma_{zx} & \gamma_{zy} & 0 \end{bmatrix}$$

where $[S_{xx} S_{yy} S_{zz}]^T$ are the individual scale factor errors for the accelerometer axes (three components) and $[\gamma_{xy} \gamma_{xz} \gamma_{yx} \gamma_{yz} \gamma_{zx} \gamma_{zy}]^T$ are the cross-axis sensitivity components. Sensitivity is also dependant on temperature.

The zeroth and first order error effects are accounted for in the bias and SFA components respectively. However, since MEMS devices typically have non-linearity in the order of 1%, it is worth describing the error model, at least for factory calibration purposes. The error model, including non-linear cross-coupling is as follows:

$$N_a = \begin{bmatrix} k_{x,xx} & k_{x,yy} & k_{x,zz} & k_{x,xy} & k_{x,xz} & k_{x,yz} \\ k_{y,xx} & k_{y,yy} & k_{y,zz} & k_{y,xy} & k_{y,xz} & k_{y,yz} \\ k_{z,xx} & k_{z,yy} & k_{z,zz} & k_{z,xy} & k_{z,xz} & k_{z,yz} \end{bmatrix} \begin{bmatrix} (f_x)^2 \\ (f_y)^2 \\ (f_z)^2 \\ f_x f_y \\ f_x f_z \\ f_y f_z \end{bmatrix}$$

where $f_{ib}^b = [f_x f_y f_z]^T$. Gyros are also sensitive to acceleration to the order of 0.1°/s/g, which is the same order of magnitude as the turn-on bias when subjected to gravity. Therefore, it may be worth modelling to determine its effect. The acceleration sensitivity (sometimes called g-sensitivity), including second-order effects are given by:

$$G_g = \begin{bmatrix} g_{x,x} & g_{x,y} & g_{x,z} & g_{x,xx} & g_{x,yy} & g_{x,zz} & g_{x,xy} & g_{x,xz} & g_{x,yz} \\ g_{y,x} & g_{y,y} & g_{y,z} & g_{y,xx} & g_{y,yy} & g_{y,zz} & g_{y,xy} & g_{y,xz} & g_{y,yz} \\ g_{z,x} & g_{z,y} & g_{z,z} & g_{z,xx} & g_{z,yy} & g_{z,zz} & g_{z,xy} & g_{z,xz} & g_{z,yz} \end{bmatrix} \begin{bmatrix} f_x \\ f_y \\ f_z \\ (f_x)^2 \\ (f_y)^2 \\ (f_z)^2 \\ f_x f_y \\ f_x f_z \\ f_y f_z \end{bmatrix}$$

Other errors are sometimes referred to or modelled in literature. These include scale-factor asymmetry, lock-in (typically seen in optical gyros), quantisation error, sinusoidal noise, flicker noise, correlated noise and rate-ramp noise; the latter few are typically mentioned in context of an Allan-variance plot. Angular random walk (or velocity random walk for accelerometers) refers to white noise at the 1 Hz point of the Allan-variance chart.

Generally, these errors will be small compared to white noise in the current generation of MEMS devices, or may be incorporated into a random-walk bias component unless there is compelling evidence that they should be individually modelled.

Of the possible error sources from the inertial sensors, some will be need to be estimated online whereas others are stable and small enough to be ignored or measured and compensated in production. Each error term becomes an additional state in the filter and hence increases the computational requirement to estimate online. The bias terms will almost always be estimated online. The scale factor and misalignment terms are sometimes estimated online. Other terms are only rarely estimated online. The selection of instrument errors to estimate online is an engineering trade-off between sensor quality, computational resources and desired system accuracy.

The INS mechanisation equations and the GNSS measurements together constitute a process and measurement model in the following form:

$$\dot{x}(k) = f(x(k), u(k), v(k))$$

$$y(k) = h(x(k), w(k))$$

where the state vector x(t) consists of the position, velocity, attitude and sensor error parameters with covariance P(k), u(t) is a "control vector" consisting of the IMU measurements, and v(t) is a white noise vector with covariance Q(k), modelling the IMU measurement noise and driving any process model of the sensor error dynamics. Similarly, y(t) consists of the GNSS measurements (position and, optionally, velocity) as a function of the current (true) state and the measurement noise vector w(t) with covariance R(k).

The estimation task is to infer the state vector x(t), given a set of noisy measurements y(k), y(k−1), ..., y(k−n). For a general non-linear function, a general optimal estimate for x(t) is not possible and hence suboptimal filters are of interest. As noted previously, a linearised approximation can perform poorly with low-cost sensors and more sophisticated schemes are desirable.

The estimator adopted for this task is the Divided Difference Filter (DDF), first published by Norgaard (M. Norgaard, N. Poulsen, O. Ravn: "New developments in state estimation for nonlinear systems." *Automatica*, 36 (11): 1627-1638, 2000) and shown to have superior performance to the (linearised) Extended Kalman Filter (EKF). Conceptually, the principle underlying the DDF resembles that of the EKF and its higher-order relatives. The implementation is, however, quite different. The major difference between the DDF and the EKF is that the DDF recovers the mean and covariance from a number of samples propagated through the full non-linear dynamics of the system. The samples are selected based on Stirling's interpolation formula which is conceptually similar to Taylor's approximation, but with very different results. Furthermore, these samples may take into account the non-linear dynamics of how process noise propagates through the system. Compared to this, the EKF propagates a single sample through the non-linear dynamics with zero noise to estimate the mean, and the covariance propagated via a linearization of the state dynamics.

For reasons of computational efficiency and numerical stability, the covariance matrices are implemented in terms of their Cholesky factors rather than symmetric matrices, i.e.

$$Q = S_v S_v^T$$

$$P = S_x S_x^T$$

The a priori update is then performed as follows.

Let the jth column of matrix $S_x$ be denoted $S_{x,j}$. Four "divided difference" matrices are then constructed as:

$$S_{xx,j}^{(1)} = \frac{1}{2h}[f(x(k|k) + hS_{x,j}, u(k), v(k)) - f(x(k|k) - hS_{x,j}, u(k), v(k))]$$

$$S_{xv,j}^{(1)} = \frac{1}{2h}[f(x(k|k), u(k), v(k) + hS_{v,j}) - f(x(k|k), u(k), v(k) - hS_{v,j})]$$

$$S_{xx,j}^{(2)} = \frac{\sqrt{h^2-1}}{2h^2}[f(x(k|k) + hS_{x,j}, u(k), v(k)) + f(x(k|k) - hS_{x,j}, u(k), v(k)) - 2f(x(k|k), u(k), v(k))]$$

$$S_{xv,j}^{(2)} = \frac{\sqrt{h^2-1}}{2h^2}[f(x(k|k), u(k), v(k) + hS_{v,j}) + f(x(k|k), u(k), v(k) - hS_{v,j}) - 2f(x(k|k), u(k), v(k))]$$

where h is a tuning factor controlling the spread of the covariance. Note only functional evaluations are required, not any derivatives. A total of $2(N_x+N_v)+1$ functional evaluations are required, where $N_x$ is the length of the state vector and $N_v$ is the length of the process noise vector.

The predicted mean, x(k+1|k), may then be calculated as:

$$x(k+1|k) = \frac{h^2 - N_x - N_v}{h^2} f(x(k|k), u(k), v(k)) + \frac{1}{2h^2}\sum_{j=1}^{N_x}[f(x(k|k) + hS_{x,j}, u(k), v(k)) - f(x(k|k) - hS_{x,j}, u(k), v(k))] + \frac{1}{2h^2}\sum_{j=1}^{N_v}[f(x(k|k), u(k), v(k) + hS_{v,j}) + f(x(k|k), u(k), v(k) - hS_{v,j})]$$

The predicted covariance Cholesky factor is then calculated as:

$$S_x(k+1|k) = \text{triag}([S_{xx}^{(2)} S_{xv}^{(1)} S_{xx}^{(2)} S_{xv}^{(2)}])$$

where S=triag(A) produces a triangular matrix such that $SS^T = AA^T$. The a posteriori update is similarly performed.

Let $\bar{S}_x = S_x(k+1|k)$, $\bar{x} = x(k+1|k)$ and $\bar{w} = E[w(k+1)]$. A set of four matrices are defined with the columns being:

$$S_{y\bar{x},j}^{(1)} = \frac{1}{2h}[g(\bar{x} + h\bar{S}_{x,j}, \bar{w}) - g(\bar{x} - h\bar{S}_{x,j}, \bar{w})]$$

$$S_{yw,j}^{(1)} = \frac{1}{2h}[g(\bar{x}, \bar{w} + hS_{w,j}) - g(\bar{x}, \bar{w} - hS_{w,j})]$$

$$S_{y\bar{x},j}^{(2)} = \frac{\sqrt{h^2-1}}{2h^2}[g(\bar{x} + h\bar{S}_{x,j}, \bar{w}) + g(\bar{x} - h\bar{S}_{x,j}, \bar{w}) - 2g(\bar{x}, \bar{w})]$$

$$S_{yw,j}^{(2)} = \frac{\sqrt{h^2-1}}{2h^2}[g(\bar{x}, \bar{w} + hS_{w,j}) + g(\bar{x}, \bar{w} - hS_{w,j}) - 2g(\bar{x}, \bar{w})]$$

Note once again that no derivatives are required—only $2(N_x+N_v)+1$ functional evaluations.

The predicted measurement is given as:

$$\bar{y}(k+1|k) = \frac{h^2 - N_x - N_w}{h^2}[g(\bar{x}, \bar{w})] + \frac{1}{2h}\sum_{j=1}^{N_x}[g(\bar{x} + h\bar{S}_{x,j}, \bar{w}) + g(\bar{x} - h\bar{S}_{x,j}, \bar{w})] + \frac{1}{2h}\sum_{j=1}^{N_w}[g(\bar{x}, \bar{w} + hS_{w,j}) + g(\bar{x}, \bar{w} - hS_{w,j})]$$

With the predicted measurement covariance factor (note that it is not triangularised) given by:

$$S_y(k+1|k) = [S_{y\bar{x}}^{(1)} S_{yw}^{(1)} S_{y\bar{x}}^{(2)} S_{yw}^{(2)}]$$

The cross-covariance of the measurements and the states is given by $$P_{\bar{x}y}(k+1) = \bar{S}_x(k+1|k)(S_{y\bar{x}}^{(1)})^T$$

With the Kalman Gain calculated as:

$$K(k+1) = P_{\bar{x}y}(k+1)[S_y(k+1|k)S_y(k+1|k)^T]^{-1}$$

The state vector is then updated as:

$$x(k+1|k+1) = x(k+1|k) + K(k+1)(y(k+1) - \bar{y}(k+1|k))$$

With the state Cholesky factor updated as:

$$S_x(k+1|k+1) = \text{triag}([\bar{S}_x - KS_{y\bar{x}}^{(1)} KS_{yw}^{(1)} KS_{y\bar{x}}^{(2)} KS_{yw}^{(2)}])$$

A key component of the GPS/INS filter is the estimation of attitude. The implicit assumption of the DDF is that the variables in the state vector belong to vector space (additive, scaling and other mathematical operations apply). However, attitude does not belong in vector space since it can be quite easily shown that attitude angles are not additive. Rather, attitude belongs to the special orthogonal group and thus vector operations that underpin the DDF cannot be directly used.

Furthermore, some attitude representations are double-cover (more than one numerical value for the same attitude) which is problematic for a filter where points are weighted and averaged. For example, the arithmetic mean of rotation vectors [π 0 0] and [-π 0 0] (which represent the same rotation) results in [0 0 0], whereas the true angle average should result in either [π 0 0] or [-π 0 0].

The direct representation of attitude as a state in a DDF is therefore problematic. The solution of the present invention has been adapted from spacecraft navigation literature originally developed for a different estimation filter: J. Crassidis, F. Markley: "Unscented filtering for spacecraft attitude estimation. *Journal of Guidance Control and Dynamics*, 26 (4): 536, 2003. Whilst large angles are not additive, small angles denoted in a three-parameter representation are approximately additive. Therefore representing the attitude state as a deviation from a nominal attitude (i.e. an error state) will allow it to be applied and the DDF framework can be used with only minor modifications. It is worthwhile noting the difference of this approach to that disclosed in US 2005 0 251 328, in which the quaternion attitude is directly used in the state vector. Such a representation is problematic for two reasons: firstly, as discussed, quaternions certainly do not belong in vector space; and secondly, the requirement to maintain unity magnitude of the quaternion makes a weighted average of points difficult to apply.

For technical reasons, the attitude of the pole is maintained as a unit quaternion, which is a four-parameter representation of attitude. Quaternions are discussed in detail in J. A. Farrell, *Aided Navigation: GPS with High Rate Sensors*. McGraw Hill, 2008, and other attitude representations are discussed in Malcolm D. Shuster, A survey of attitude representations. *Journal of the Astronautical Sciences*, 41(4): 439-517, 1993.

For a three-parameter representation of attitude, the Generalised Rodrigues Parameters (GRP) is chosen, which has a simple conversion from a Quaternion based on two parameters a and f which control the location of the singularity in the GRP. All three-parameter representations have a singularity or other ambiguous representation at specific angles. It is up to the designer to ensure that the singular point(s) will not be encountered.

For a quaternion $q=[q_0 \, \bar{q}]^T$, conversion between a Quaternion and GRP can be achieved as follows:

$$\text{Quaternion} \rightarrow GRP(q, a, f) = \frac{f}{a+q_0}\bar{q}$$

Similarly, a Quaternion may be constructed from a GRP as follows:

$$GRP \rightarrow \text{Quaternion}(s, a, f) = \begin{cases} q_0 = \dfrac{-a\|s\|^2 + f\sqrt{f^2 + (1-a^2)\|s\|^2}}{f^2 + \|s\|^2} \\ \bar{q} = \dfrac{a+q_0}{f}s \end{cases}$$

To illustrate the implementation of the filter, the state vector for the GNSS/INS filter is chosen as follows:

$$x = [\delta s_{b_i}{}^b \, r_{eb}{}^e \, v_{eb}{}^e \, b_a \, b_g]$$

where $\delta s_{b_i}{}^b$ is the GRP attitude error, $r_{eb}{}^e$ is the position of the Centre of Navigation (CoN) with respect the ECEF frame, $v_{eb}{}^e$ is the velocity of the CoN with respect to the earth and the remaining terms are inertial sensor errors as described above. Optionally, the system designer may choose the implement other inertial sensor errors such as Scale Factor or Cross-Axis Sensitivity, or the lever arm between the IMU and GNSS antenna, pending the quality of the sensors and available computing resources.

The attitude quaternion $q_b{}^e$ is maintained separately from the state vector and will be further described below.

Note that since the attitude error forms part of the state vector, the initial nominal attitude $q_b{}^e$ that the deviation is with respect to, and the central predicted attitude $q_{b_0}{}^e(k+1|k)$ must be part of the "control input" to the modified INS mechanisation Equations, which are described below.

From a given a priori attitude error $(\delta s_{b_i}{}^b(k|k))$ at time k, an error quaternion is generated (dropping the GRP parameters a and f):

$$\delta q_{b_i}{}^b(k|k) = \text{GRP} \rightarrow \text{Quaternion}(\delta s_{b_i}{}^b(k|k))$$

The generated error quaternion is used to adjust the nominal attitude quaternion $$q_{b_i}{}^e(k|k) = q_b{}^e(k|k) \otimes \delta q_{b_i}{}^b(k|k)$$

The adjusted attitude $q_{b_i}{}^e(k|k)$ is then propagated through the normal INS Mechanisation equations (as described above) to $q_{b_i}{}^e(k+1|k)$. The anomaly from the central predicted sigma-point $q_{b_0}{}^e(k+1|k)$ $$\delta q_{b_i}{}^{b_0}(k+1|k) = (q_{b_0}{}^e(k+1|k))^{-1} \otimes q_{b_i}{}^e(k+1|k)$$

The attitude error that forms the predicted state is generated from the central predicted attitude anomaly $$\delta s_{b_i}{}^{b_0}(k+1|k) = \text{Quaternion} \rightarrow \text{GRP}(\delta q_{b_i}{}^{b_0}(k+1|k))$$

The calculated $\delta s_{b_i}{}^{b_0}(k+1|k)$ is then propagated through the DDF equations, which will produce a mean anomaly, $\delta s_{\bar{b}}{}^{b_0}(k+1|k)$. The computed mean anomaly is converted to a quaternion:

$$\delta q_{\bar{b}}{}^{b_0}(k+1|k) = \text{GRP} \rightarrow \text{Quaternion}(\delta s_{\bar{b}}{}^{b_0}(k+1|k))$$

before being used to correct the centrally predicted quaternion:

$$q_{\bar{b}}{}^e(k+1|k) = q_{b_0}{}^e(k+1|k) \otimes \delta q_{\bar{b}}{}^{b_0}(k+1|k)$$

Since the mean attitude anomaly is used to correct the externally-maintained attitude, it is reset to zero at the end of this operation. Note that since only the mean is altered, the covariance remains unchanged.

The remaining matter is how to obtain the central predicted quaternion, $q_{b_0}{}^e(k+1|k)$. It is obtained simply by propagating the state vector with zero noise through the INS mechanisation equations. At this point, by definition, the attitude anomaly GRP is zero.

A measurement update may be performed through a similar process. A quaternion anomaly is generated from the GRP for a given state vector $$\delta q_{b_i}{}^{\bar{b}}(k+1|k) = \text{GRP} \rightarrow \text{Quaternion}(\delta s_{b_i}{}^{\bar{b}}(k+1|k))$$

The attitude used to predict the measurement may then be calculated as:

$$q_{b_i}{}^e(k+1|k) = q_b{}^e(k+1|k) \otimes \delta q_{b_i}{}^{\bar{b}}(k+1|k)$$

The measurement equations for the DDF are calculated $q_{b_i}{}^e(k+1|k)$, producing an updated state estimate $s_b{}^{\bar{b}}(k+1|k+1)$ which may then be converted to a quaternion:

$$q_b{}^b(k+1|k+1) = \text{GRP} \rightarrow \text{Quaternion}(s_b{}^b(k+1|k1))$$

The quaternion $\delta q_{b_i}^{b}(k+1|k+1)$ is then used to update the predicted quaternion $q_b^e(k+1|k+1)$ $$q_b^e(k+1|k+1) = q_{\bar{b}}^e(k+1|k) \otimes q_b^{\bar{b}}(k+1|k+1)$$

BRIEF DESCRIPTION OF THE DRAWINGS

The invention in the following will be described in detail by referring to exemplary embodiments that are accompanied by figures, in which:

FIG. 5 shows an upgrade kit for a survey system; and

FIG. 6 shows a surveying module of a surveying system.

DETAILED DESCRIPTION

Figure 1A:
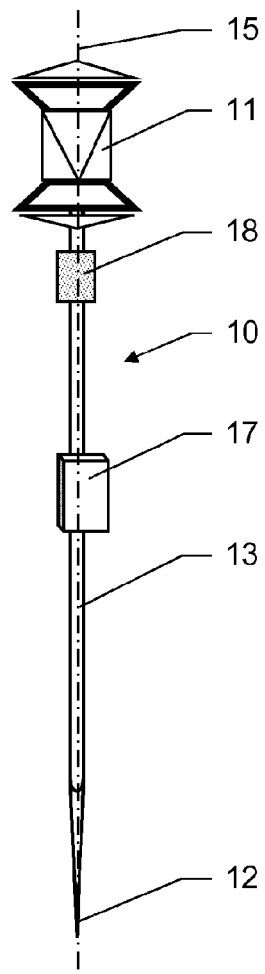
FIG. 1a shows a first embodiment of a survey pole according to the invention.

FIG. 1a shows a first embodiment of a survey pole 10 as part of a surveying system according to the invention. The survey pole 10 has a rigid, rod-shaped body 13 with a pointer tip 12 for contacting a measuring point on the ground. The body 13 defines a pole axis 15. The pole 10 comprises retro-reflector means 11 as position giving means for making available the coordinative determination of a referenced position, the retro-reflector means 11 being positioned on the body 13 at a known position relative to the tip 12. The system also comprises determination means for repeatedly determining the referenced position of the position giving means. The survey pole 10 further comprises an inertial measuring unit 18 placed on the body 13 with a defined spatial relationship relative to the position giving means, wherein the inertial measuring unit 18 is designed in form of a micro-electro-mechanical system and comprises IMU-sensors including accelerometers and gyroscopes. The pole 10 comprises evaluation means 17 for deriving the position of the measuring point 1 at least based on the determined referenced position and on the defined spatial relationship of the position giving means relative to the tip 12.

The inertial measuring unit 18 comprises three accelerometers in a mutually orthogonal configuration, i.e. in a configuration such that their measuring axes are orthogonal to each other, and three gyroscopes in a mutually orthogonal configuration, i.e. in a configuration such that their measuring axes are orthogonal to each other.

Figure 1B:
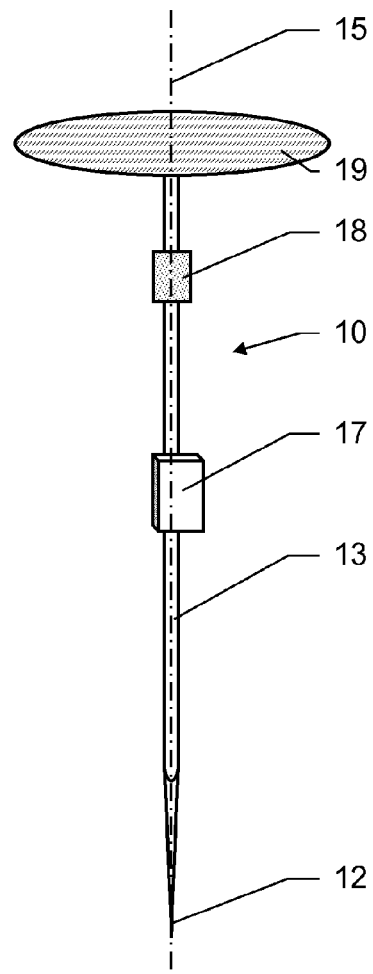
FIG. 1b shows a second embodiment of a survey pole according to the invention.

FIG. 1b shows a second embodiment of a survey pole 10 as part of a surveying system according to the invention. The survey pole 10 has a rigid, rod-shaped body 13 with a pointer tip 12 for contacting a measuring point on the ground. The body 13 defines a pole axis 15. The pole 10 comprises a GNSS receiver 19 as position giving means for making available the coordinative determination of a referenced position, the GNSS receiver 19 being positioned on the body 13 at a known position relative to the tip 12. The system also comprises determination means for repeatedly determining the referenced position of the position giving means. The survey pole 10 further comprises an inertial measuring unit 18 placed on the body 13 with a defined spatial relationship relative to the position giving means, wherein the inertial measuring unit 18 is designed in form of a micro-electro-mechanical system and comprises IMU-sensors including accelerometers and gyroscopes. The pole 10 comprises evaluation means 17 for deriving the position of the measuring point 1 at least based on the determined referenced position and on the defined spatial relationship of the position giving means relative to the tip 12.

The inertial measuring unit 18 comprises three accelerometers in a mutually orthogonal configuration, i.e. in a configuration such that their measuring axes are orthogonal to each other, and three gyroscopes in a mutually orthogonal configuration, i.e. in a configuration such that their measuring axes are orthogonal to each other.

Although the inertial measuring unit 18 in FIGS. 1a and 1b is depicted as an external feature of the pole 10, obviously it can also be integrated into the body 13. Moreover, the evaluation means 17, which are depicted in FIGS. 1a and 1b as an external feature of the pole 10, can also be part of the inertial measuring unit 18 or the GNSS receiver 19, or integrated into the body 13.

Figure 2:
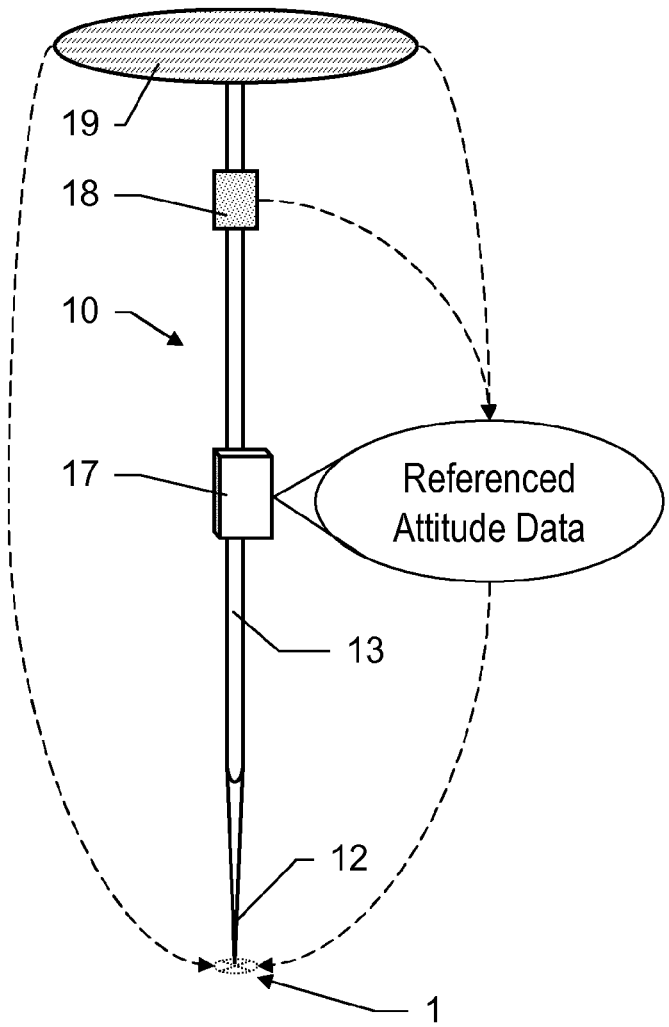
FIG. 2 illustrates the surveying method for measuring the position of a measuring point according to the invention.

FIG. 2 illustrates the surveying method according to the invention. A survey pole 10 is depicted having a body 13 with a pointer tip 12 for contacting the measuring point 1 and a GNSS receiver 19 as position giving means for making available the coordinative determination of a referenced position. The GNSS receiver 19 is placed on the body 13 with a defined spatial relationship relative to the tip 12.

The survey pole 10 further comprises an inertial measuring unit 18 placed on the body 13 with a defined spatial relationship relative to the GNSS receiver 19. The inertial measuring unit 18 is designed in form of a micro-electro-mechanical system and comprises IMU-sensors including accelerometers and gyroscopes. Evaluation means 17 are provided for deriving the position of the measuring point 1 at least based on the determined referenced position and on the defined spatial relationship of the position giving means relative to the tip 12.

The data flow is depicted with broken lined arrows: The GNSS receiver 19 provides referenced position data and the inertial measuring unit 18 provides inertial state data. By feeding this data into a predefined filter algorithm of the evaluation means 17, Referenced Attitude Data for the survey pole 10 is derived. This Referenced Attitude Data and referenced position data provided by the GNSS receiver 19 are used for deriving the position of the measuring point 1. Instead of the referenced position data provided by the GNSS receiver 19, the position of the inertial measuring unit 18 calculated by the filter may be used. The spatial relationship is then between the CoN of the inertial measuring unit 18 and the tip 12, but the requirement for attitude is unchanged.

The surveying method according to the invention comprises
- repeatedly determining the referenced position of the position giving means,
- deriving the position of the measuring point 1 at least based on the determined referenced position and on the defined spatial relationship of the position giving means, e.g. the retro reflector 11 or the GNSS receiver 19, relative to the tip 12,
- repeatedly determining inertial state data based on measurements taken by the inertial measuring unit 18 and
- feeding a predefined filter algorithm with the repeatedly determined referenced position and the repeatedly determined inertial state data and deriving therefrom referenced attitude data for the survey pole 10, taking into account the defined spatial relationship of the inertial measuring unit 18 relative to the position giving means, and further using the referenced attitude data for deriving the position of the measuring point 1.

Figure 3:
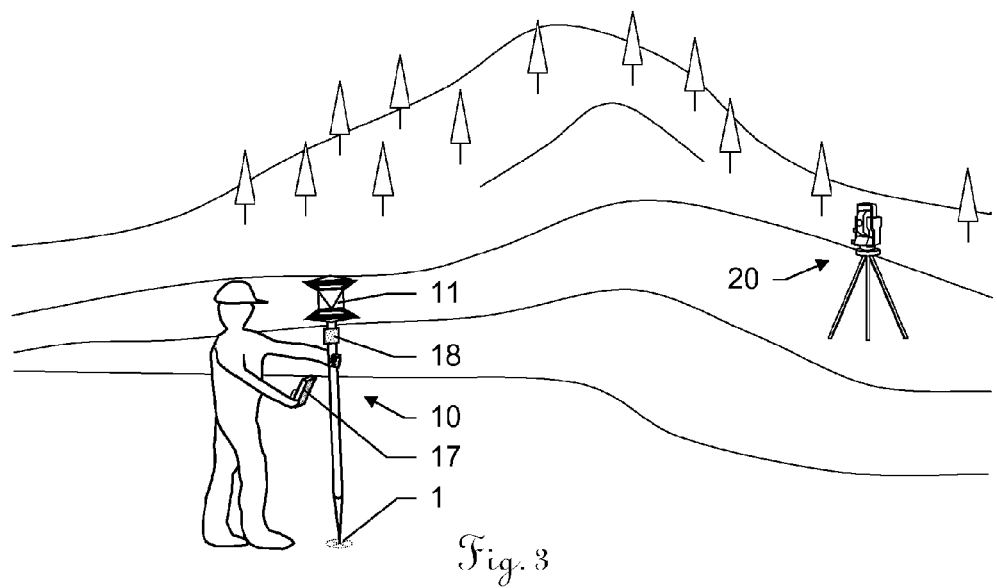
FIG. 3 shows a surveying system with the first embodiment of a survey pole according to the invention.

In FIG. 3 a surveying system comprising the first embodiment of the survey pole 10 (as shown in FIG. 1*a*) and a total station 20 is depicted.

The survey pole 10 comprises a rigid, rod-shaped body 13 having a pointer tip 12 for contacting a measuring point 1 on the ground, the body 13 defining a pole axis 15. Retroreflector means 11 are positioned on the body 13 at a known position relative to the tip 12. A hand-held display and controlling device comprising evaluation means 17 is held by a user operating the pole 10.

The total station 20 comprises a telescope unit that is adapted for measuring a distance to the retro-reflector 11 of the tilt pole 10.

The user positions the tip 12 of the survey pole 10 on a measuring point 1, the position of which is to be determined. By means of the total station 20 and the retroreflector 11 referenced position data of the survey pole 10 is provided. The inertial measuring unit 18 provides inertial state data of the survey pole 10. The evaluation means 17 from this data derive Referenced Attitude Data for the survey pole 10. The Referenced Attitude Data is then used to derive a position of the measuring point 1.

Figure 4:
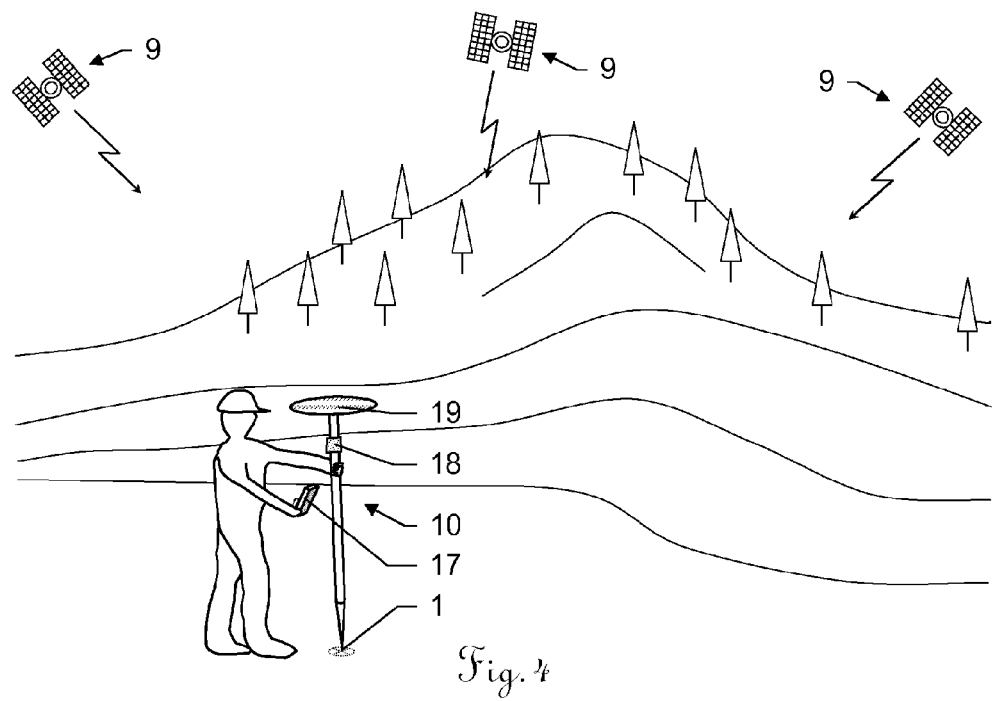
FIG. 4 shows a surveying system with the second embodiment of a survey pole according to the invention.

In FIG. 4 a surveying system comprising the second embodiment of the survey pole 10 (as shown in FIG. 1*b*) is depicted.

The survey pole 10 comprises a rigid, rod-shaped body 13 having a pointer tip 12 for contacting a measuring point 1 on the ground, the body 13 defining a pole axis 15. A GNSS receiver 19 is positioned on the body 13 at a known position relative to the tip 12. A hand-held display and controlling device comprising evaluation means 17 is held by a user operating the pole 10.

The user positions the tip 12 of the survey pole 10 on a measuring point 1, the position of which is to be determined. By means of satellites 9 and the GNSS receiver 19 referenced position data of the survey pole 10 is provided. The evaluation means 17 from this data derive Referenced Attitude Data for the survey pole 10. The Referenced Attitude Data is then used to derive a position of the measuring point 1.

In FIG. 5 an upgrade kit 30 for a surveying system is depicted. The surveying system comprises a survey pole 10 with a body 13 having a pointer tip 12 for contacting the measuring point 1 and a GNSS-antenna 19 as position giving means for making available the coordinative determination of a referenced position. The GNSS-antenna 19 is positioned on the body 13 with a defined spatial relationship relative to the tip 12.

The system also comprises determination means for repeatedly determining the referenced position of the position giving means and first evaluation means 17 for deriving the position of the measuring point 1 at least based on the determined referenced position and on the defined spatial relationship of the position giving means relative to the tip 12. The upgrade kit 30 comprises an inertial measuring unit 38 to be placed on the body 13 of the survey pole 10 with a defined spatial relationship relative to the position giving means, wherein the inertial measuring unit 38 comprises IMU-sensors including accelerometers and gyroscopes, IMU-processing means for repeatedly determining inertial state data based on measurements taken by the inertial measuring unit, and second evaluation means 37.

The second evaluation means 37 are configured for receiving the repeatedly determined referenced position and the repeatedly determined inertial state data, feeding a predefined filter algorithm with the repeatedly determined referenced position and the repeatedly determined inertial state data and deriving therefrom referenced attitude data for the survey pole 10. For this purpose a Divided Difference Filter is used within the predefined filter algorithm, and the defined spatial relationship of the inertial measuring unit 38 relative to the position giving means is taken into account. The referenced attitude data is used for deriving the position of the measuring point 1.

The upgrade kit 30 comprises attaching means 33 for attaching the upgrade kit 30 to the body 13 of the survey pole 10. Although the upgrade kit 30 in FIG. 5 is depicted attached to the body 13 in the middle section of the pole 10, obviously it is also possible to attach it next to the position giving means or near the tip 12.

FIG. 6 shows a surveying module 40 for a surveying system. The surveying system comprises a survey pole 10 with a body 13 having a pointer tip 12 for contacting the measuring point 1. The surveying module 40 comprises a GNSS-antenna 49 as position giving means for making available the coordinative determination of a referenced position, wherein the GNSS-antenna 49 is to be placed on the body 13 of the survey pole 10 with a defined spatial relationship relative to the tip 12. The surveying module 40 also comprises determination means for repeatedly determining the referenced position of the position giving means and evaluation means 37 for deriving the position of the measuring point 1 at least based on the determined referenced position and on the defined spatial relationship of the position giving means relative to the tip 12.

Moreover, the surveying module 40 comprises an inertial measuring unit 48 that is to be placed on the body 13 of the survey pole 10 with a defined spatial relationship relative to the position giving means, wherein the inertial measuring unit 48 comprises IMU-sensors including accelerometers and gyroscopes, and IMU-processing means for repeatedly determining inertial state data based on measurements taken by the inertial measuring unit.

The evaluation means 47 are configured for receiving the repeatedly determined referenced position and the repeatedly determined inertial state data, feeding a predefined filter algorithm with the repeatedly determined referenced position and the repeatedly determined inertial state data and deriving therefrom referenced attitude data for the survey pole 10. For this purpose a Divided Difference Filter is used within the predefined filter algorithm, and the defined spatial relationship of the inertial measuring unit 48 relative to the position giving means is taken into account. The referenced attitude data is used for deriving the position of the measuring point 1.

Alternatively, the evaluation means 47 and the inertial measuring unit 48 of the surveying module 40 can be integrated into the GNSS receiver 49. Alternatively, the surveying module 40 can be in a two-part form, for instance one part comprising the position-giving means and the other one comprising the inertial measuring unit 48.

The surveying module 40 comprises attaching means 43 for attaching the surveying module 40 to the body 13 of the survey pole 10. The attaching means 43 can also be adapted to screw the surveying module 40 onto the top end of the survey pole 10.

Although the invention is illustrated above, partly with reference to some preferred embodiments, it must be understood that numerous modifications and combinations of different features of the embodiments can be made. All of these modifications lie within the scope of the appended claims.

What is claimed is:

1. A surveying system for measuring the position of a measuring point on the ground, the surveying system comprising:
a survey pole including:
a body having a pointer tip for contacting the measuring point; and
position giving means for making available the coordinative determination of a referenced position, the position giving means being placed on the body with a defined spatial relationship relative to the tip, wherein the position giving means comprise a retro reflector and/or a GNSS-antenna,
determination means for repeatedly determining the referenced position of the position giving means; and
evaluation means for deriving the position of the measuring point at least based on the determined referenced position and on the defined spatial relationship of the position giving means relative to the tip;
wherein the survey pole further comprises an inertial measuring unit placed on the body with a defined spatial relationship relative to the position giving means,
wherein the inertial measuring unit comprises IMU-sensors including accelerometers and gyroscopes,
wherein the surveying system further comprises IMU-processing means for repeatedly determining inertial state data based on measurements taken by the inertial measuring unit and in that the evaluation means are further configured to
feed a predefined filter algorithm with the repeatedly determined referenced position and the repeatedly determined inertial state data and deriving therefrom referenced attitude data for the survey pole, taking into account the defined spatial relationship of the inertial measuring unit relative to the position giving means,
use a Divided Difference Filter within the predefined filter algorithm, and
further use the referenced attitude data for deriving the position of the measuring point.

2. The surveying system according to claim 1, wherein:
the inertial measuring unit is designed in form of a micro-electro-mechanical system and comprises IMU-sensors including accelerometers and gyroscopes.

3. The surveying system according to claim 1, wherein:
the inertial measuring unit comprises inertial sensors of tactical grade or lower accuracy.

4. The surveying system according to claim 1, wherein:
the inertial measuring unit comprises inertial sensors of industrial grade or lower accuracy.

5. The surveying system according to claim 1, wherein:
the inertial measuring unit comprises at least three accelerometers in a mutually orthogonal configuration and at least three gyroscopes in a mutually orthogonal configuration,
the IMU-processing means are configured for determining inertial attitude, inertial velocity data and inertial position data as part of the inertial state data, and/or
the evaluation means are further configured for deriving a referenced yaw angle as well as a referenced pitch angle and a referenced roll angle of the survey pole as the referenced attitude data.

6. The surveying system according to claim 1, wherein:
the inertial measuring unit further comprises at least one magnetometer, and
wherein the IMU-processing means are configured for determining also compass-attitude data as part of the inertial state data.

7. The surveying system according to claim 1, wherein:
the inertial measuring unit further comprises two or three magnetometers in a mutually orthogonal configuration, and
wherein the IMU-processing means are configured for determining also compass-attitude data as part of the inertial state data.

8. The surveying system according to claim 1, wherein:
the IMU-processing means are configured for repeatedly determining the inertial state data at an equal or a higher rate than the determination means the referenced position, and
the evaluation means are configured for feeding the predefined filter algorithm with the repeatedly determined inertial state data with an equal or a higher rate than with the repeatedly determined referenced position.

9. The surveying system according to claim 1, wherein the position giving means comprise a retro reflector, wherein:
the determination means comprise a total station or a tachometer for measuring the referenced position of the retro reflector.

10. The surveying system according to claim 1, wherein the position giving means comprise a GNSS-antenna,
wherein the determination means comprise a GNSS-processing unit for processing output-signals of the GNSS-antenna and deriving therefrom the referenced position of the GNSS antenna.

11. An upgrade kit for a surveying system for measuring the position of a measuring point on the ground, the upgrade kit being adapted for detecting attitude data, the surveying system comprising:
a survey pole with:
a body having a pointer tip for contacting the measuring point and
position giving means for making available the coordinative determination of a referenced position, the position giving means being placed on the body with a defined spatial relationship relative to the tip, wherein the position giving means comprise a retro reflector and/or a GNSS-antenna,
determination means for repeatedly determining the referenced position of the position giving means and
first evaluation means for deriving the position of the measuring point at least based on the determined referenced position and on the defined spatial relationship of the position giving means relative to the tip, wherein:
the upgrade kit comprises:
an inertial measuring unit to be placed on the body with a defined spatial relationship relative to the position giving means, wherein the inertial measuring unit comprises IMU-sensors including accelerometers and gyroscopes,
IMU-processing means for repeatedly determining inertial state data based on measurements taken by the inertial measuring unit, and
second evaluation means configured for:
receiving the repeatedly determined referenced position and the repeatedly determined inertial state data, feeding a predefined filter algorithm with the repeatedly determined referenced position and the repeatedly determined inertial state data and deriving therefrom referenced attitude data for the survey pole, taking into account the defined spatial relationship of the inertial measuring unit relative to the position giving means, using a Divided Difference Filter within the predefined filter algorithm, and using the referenced attitude data for deriving the position of the measuring point.

12. The upgrade kit according to claim 11, further comprising:
attaching means for attaching the upgrade kit or parts thereof to the survey pole.

13. The upgrade kit according to claim 11, further comprising:
means for detecting and/or defining a spatial relationship of the inertial measuring unit relative to the position giving means.

14. The upgrade kit according to claim 11, further comprising:
attaching means for attaching the inertial measuring unit to the survey pole.

15. A surveying module for a surveying system for measuring the position of a measuring point on the ground, the surveying module being adapted for detecting attitude data, wherein:
the surveying system comprises a survey pole with a body having a pointer tip for contacting the measuring point, and
the surveying module comprises:
position giving means for making available the coordinative determination of a referenced position, wherein the position giving means are to be placed on the body with a defined spatial relationship relative to the tip, wherein the position giving means comprise a retro reflector and/or a GNSS-antenna,
determination means for repeatedly determining the referenced position of the position giving means and
evaluation means for deriving the position of the measuring point at least based on the determined referenced position and on the defined spatial relationship of the position giving means relative to the tip, wherein:
the surveying module further comprises:
an inertial measuring unit to be placed on the body with a defined spatial relationship relative to the position giving means, wherein the inertial measuring unit comprises IMU-sensors including accelerometers and gyroscopes, and
IMU-processing means for repeatedly determining inertial state data based on measurements taken by the inertial measuring unit, wherein the evaluation means are configured for:
receiving the repeatedly determined referenced position and the repeatedly determined inertial state data,
feeding a predefined filter algorithm with the repeatedly determined referenced position and the repeatedly determined inertial state data and deriving therefrom referenced attitude data for the survey pole, taking into account the defined spatial relationship of the inertial measuring unit relative to the position giving means,
using a Divided Difference Filter within the predefined filter algorithm, and
using the referenced attitude data for deriving the position of the measuring point.

16. A surveying method for measuring the position of a measuring point on the ground, with the help of a survey pole comprising:
a body having a pointer tip for contacting the measuring point and
position giving means for making available the coordinative determination of a referenced position, the position giving means being placed on the body with a defined spatial relationship relative to the tip, wherein the position giving means comprise a retro reflector and/or a GNSS-antenna,
the method comprising:
repeatedly determining the referenced position of the position giving means;
deriving the position of the measuring point at least based on the determined referenced position and on the defined spatial relationship of the position giving means relative to the tip, wherein the survey pole further comprises an inertial measuring unit placed on the body with a defined spatial relationship relative to the position giving means, wherein the inertial measuring unit comprises IMU-sensors including accelerometers and gyroscopes;
repeatedly determining inertial state data based on measurements taken by the inertial measuring unit;
feeding a predefined filter algorithm with the repeatedly determined referenced position and the repeatedly determined inertial state data and deriving therefrom referenced attitude data for the survey pole, taking into account the defined spatial relationship of the inertial measuring unit relative to the position giving means; and
using the referenced attitude data for deriving the position of the measuring point, wherein a Divided Difference Filter is used within the predefined filter algorithm.

17. The surveying method according to claim 16, wherein the inertial measuring unit:
is designed in form of a micro-electro-mechanical system, and/or
comprises inertial sensors of tactical grade or lower accuracy.

18. The surveying method according to claim 16, wherein:
the referenced attitude data is represented by a referenced yaw angle, a referenced pitch angle and a referenced roll angle of the survey pole.

19. The surveying method according to claim 16, wherein:
inertial position data and inertial attitude data are determined as part of the inertial state data, wherein the IMU-sensor error parameters are determined based on an error model for the IMU-sensors including at least one of:
sensor-bias,
sensitivity errors,
misalignment,
non-linearity errors, and
gyroscopes acceleration sensitivity.

20. One or more non-transitory computer-readable media storing one or more programs that are configured, when executed, to cause one or more processors to execute the method as recited in claim 16.

* * * * *